United States Patent [19]

Stanton

[11] Patent Number: 5,415,451
[45] Date of Patent: May 16, 1995

[54] ADVERTISEMENT MOUNTING SYSTEM FOR SEMI-TRAILERS AND THE LIKE

[76] Inventor: Ralph A. Stanton, 4545 S. Mission #97, Tucson, Ariz. 85714

[21] Appl. No.: 150,407

[22] Filed: Nov. 10, 1993

[51] Int. Cl.⁶ .................. B60R 13/00; B62D 33/04
[52] U.S. Cl. .................................. 296/21; 40/590; 40/605
[58] Field of Search .............. 296/21; 40/590, 605, 40/611, 591

[56] References Cited

U.S. PATENT DOCUMENTS

| | | | |
|---|---|---|---|
| 1,633,635 | 6/1927 | Harmon et al. | 296/21 X |
| 2,526,603 | 10/1950 | Damroth | 40/605 X |
| 2,724,917 | 11/1955 | Norfleet | 40/591 |
| 2,843,953 | 7/1958 | McCandess | 40/591 |
| 3,574,449 | 4/1971 | Rosenberg | 40/605 X |
| 3,802,103 | 4/1974 | Neff | 40/591 |
| 3,943,636 | 3/1976 | Branham | 40/605 |
| 5,005,893 | 4/1991 | McCrary | 296/21 |
| 5,058,299 | 10/1991 | Suzuki | 160/368.1 X |
| 5,224,439 | 7/1993 | O'Connell et al. | 40/591 X |
| 5,239,765 | 8/1993 | Opdahl | 40/590 X |

FOREIGN PATENT DOCUMENTS 0399957 11/1990 European Pat. Off. .......... 40/605

Primary Examiner—Joseph Pape
Attorney, Agent, or Firm—Ogram & Teplitz

[57] ABSTRACT

A mounting system and method allows standard billboard panels to be mounted onto the side of a commercial semi-trailer or the like. A lower retaining channel and an upper retaining channel form a track into which billboard panels are inserted and retained. Removable end channels prevent the panels from sliding out of the track. The panels are secured together by tongue and groove joints and fasteners which are inserted through apertures in adjoining panels. The panels are covered with either paid commercial advertisements similar to a conventional billboard, or with the trailer owner's own name, insignia, advertising, or the like.

15 Claims, 4 Drawing Sheets

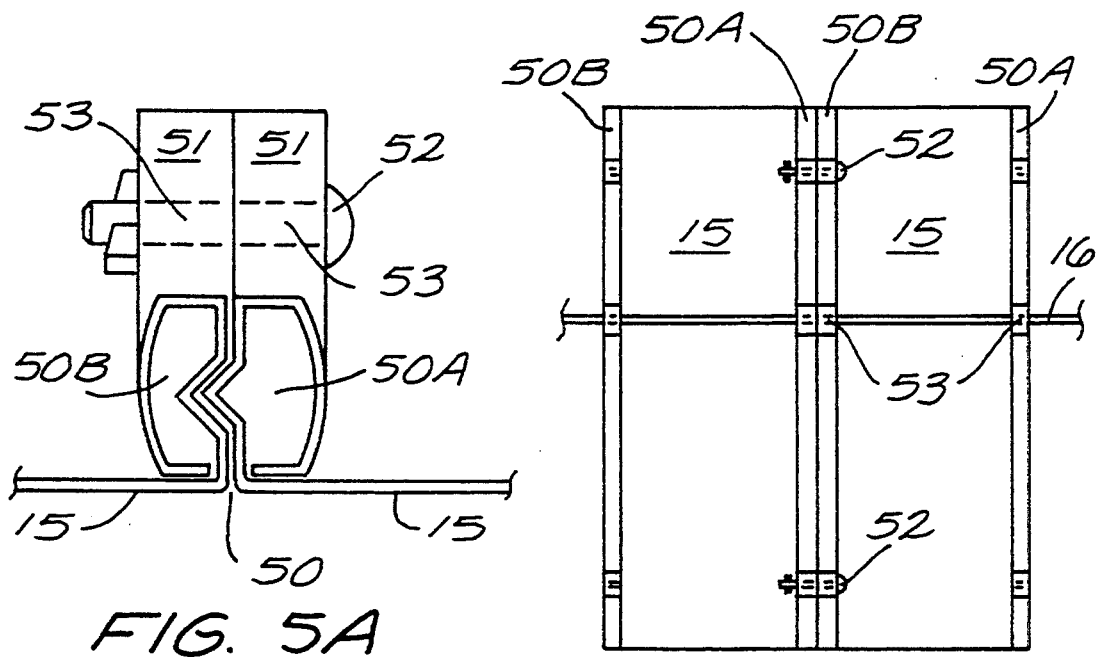
FIG. 5A
FIG. 5B
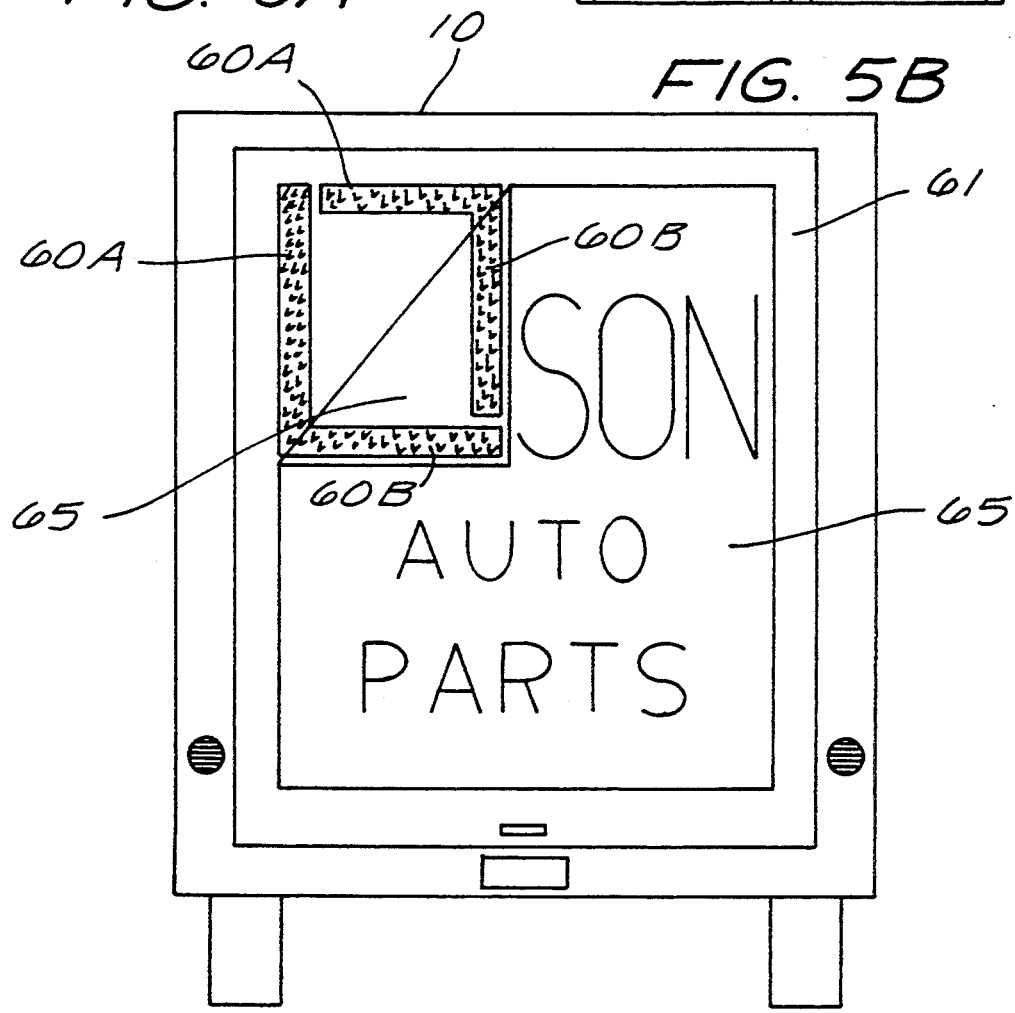
FIG. 6

ADVERTISEMENT MOUNTING SYSTEM FOR SEMI-TRAILERS AND THE LIKE

BACKGROUND OF INVENTION

This invention relates generally to mobile informational conveyance systems, and more particularly, to large commercial trucks, vans, and trailers(hereinafter "trailers") which have large exposed surface areas upon which indicia can be displayed in a highly visible fashion.

Large sums of money are spent on advertising various goods and services. One method of advertising are signs and billboards placed along highways, streets, and roads. Advertisers find this a cost effective method of advertising to a large audience of potential customers.

Also frequently seen on highways are large numbers of freight hauling vehicles transporting goods along interstate highways, local highways, and city streets. Many of these vehicles have large enclosed cargo areas. Prime examples are the huge eighteen wheel tractor semitrailer rigs. On a smaller scale are cargo trucks and vans.

Each side of these trailers provide a large expanse of exposed visible area which merely serves to enclose the cargo area. Only a minority display even the name, insignia, trademark, or logo of the owner. As a consequence, the opportunity to utilize this potentially valuable advertising space goes unused.

One type of mobile promotional vehicle is taught by U.S. Pat. No. 5,005,893, entitled "Mobile Promotional Vehicle" and issued to McCrary on Apr. 9, 1991. This reference teaches a system of mounting display panels on the side walls of a truck. However, the side walls lean outward as they extend upwardly and converge as they progress forward. As a consequence, cargo space is restricted and the vehicle has only limited use as a cargo hauling vehicle.

Clearly, there exists a need for an advertising system which: 1) is adapted for use on commercial trailers, 2) is easily mounted and replaced, and 3) uses existing billboard panels.

SUMMARY OF INVENTION

The invention creates a mounting system and method which allows standard billboard panels to be mounted to the side wall of commercial trucks, vans, semitrailers, and the like.

A lower retaining channel and an upper retaining channel form a track into which billboard panels are inserted and retained. Removable end channels attach between the ends of the retaining channels and prevent the panels from sliding out of the track. The panels are secured to one another by tongue and groove joints and fastening devices.

The panels are preferably covered with paid commercial advertisements similar to a conventional billboard, or are covered with the trailer owner's own name, insignia, advertisement, or the like.

The preferred embodiment of the invention enables standard (8 ft. 2 inch × 28 13/16 inch) billboard panels to be mounted on a semitrailer or similar vehicle. Adapting standard billboard panels for use on trailers takes advantage of the pre-existing supply of billboard panels and insures a ready supply of panel manufacturing sources. The panels are also readily interchanged between both roadside billboards and trailers.

The primary retaining means are a lower retaining channel and an upper retaining channel. The cross section of both retaining channels are substantially rectangular with an open end. The lower retaining channel has sides extending upward. The upper retaining channel has sides extending downward. Both retaining channels are parallel and spaced suitably far apart so that the panels easily slide through them but are sufficiently close so that the sides of the retaining channels retain the panels. The retaining channels are also slightly wider than the thickness of the panels so that the panels easily slide through the retaining channels.

The retaining channels are secured to the trailer with conventional nuts, bolts, and angle brackets. One leg of an angle bracket is welded to the retaining channel and the other leg is drilled to receive a bolt which passes through an aligned aperture in the side wall of the trailer and secures the angle bracket to the side wall.

In several embodiments, the lower retaining channel includes a means for reducing friction as the panels are slid through it. These friction reducing means include, but are not limited to, wheels or rollers, inserts such as plastics and teflon materials, or merely grease. In one embodiment, the panels themselves are equipped with rollers or wheels to aid in moving the panels through the retaining channels.

The panels are fastened to one another in two ways. First, adjacent panels have tongues and grooves which interlock as adjacent panels are brought together. Second, holes or apertures are formed in the panels to accommodate fasteners such as screws, nuts and bolts, shafts and locking pins, spring loaded bolts, or the like.

To load the panels onto the retaining channels, the first panel is slid part way onto the retaining channels. A second panel is attached to the first panel and both panels are slid further through the retaining channels. Succeeding panels are added in the same fashion until all the panels are in place.

To assist this mounting process, a strap or cable is attached to the leading panel for pulling the assembly of panels through the retaining channels. In one embodiment, the cable is connected to a comealong, winch, or similar device to assist in moving the assembly of panels through the retaining channels. When removing the panels, the reverse process is followed and a cable with a comealong, winch, or the like is used to remove the panels.

Although conventional roadside billboards are covered with either fabric, paper, or paint, the preferred covering for the invention's trailer mounted panels is paint. Fabric and paper are a potential traffic hazard if they detach from the panels.

For added security, a safety cable extends the length of the panels for retaining any panels which become dislodged from the retaining channels. In one embodiment, the safety cable is secured taut along the exterior of the panels between attachment anchors at each end of the retaining channels. In an alternate embodiment, the safety cable is threaded through apertures in the backside of the panels so the cable is hidden from view.

A related embodiment of the invention attaches to a rear roll-up door on a trailer. Because of the reduced wind on this part of the trailer, it has been found that a vinyl sign is easily attached to the roll-up door with hook and loop type fasteners. The vinyl sign and the hook and loop fasteners flex with the roll-up door allowing them to remain in place during operation of the door.

The hook and loop fasteners, preferably VEL-CRO®brand, are permanently secured to the rolling door using conventional fasteners such as screws, bolts, glue, or the like. Mating hook and loop fasteners are mounted on the back of the vinyl sign. The removable vinyl sign, preferably made of SUPERFLEX® brand of vinyl, is merely pressed onto the roll-up door and is secured by the hook and loop fasteners.

Numerous embodiments of this invention are envisioned and some are described below.

BRIEF DESCRIPTION OF THE DRAWINGS

FIG. 5A is a top view of two panels showing the tongue and groove joint and a fastener attaching two panels together, FIG. 5B is a rear view of two panels showing the arrangement of tongue and groove joints and fasteners, FIG. 6 shows an embodiment of the invention using a vinyl sign attached with hook and loop fasteners to the rear rolling door of a trailer.

DETAILED DESCRIPTION OF THE DRAWINGS

Figure 1:
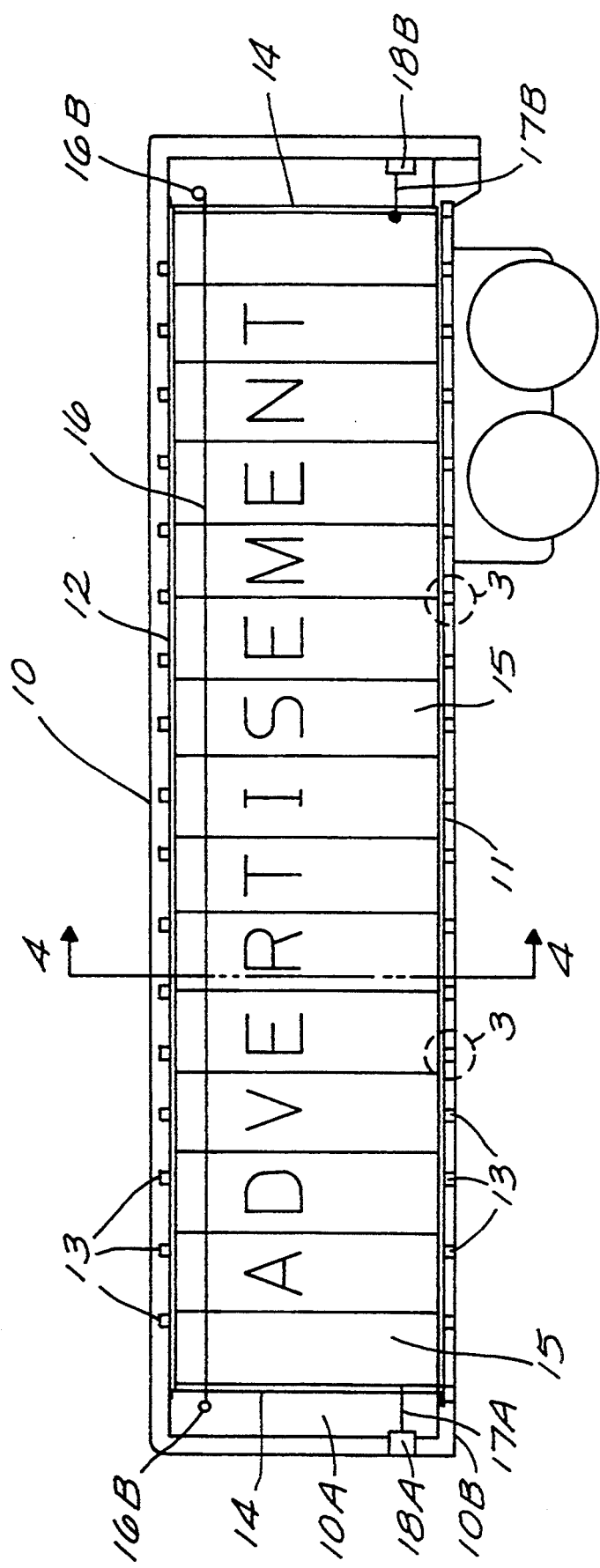
FIG. 1 shows the invention mounted on the side of a semitrailer.

FIG. 1 shows the invention mounted on the side wall of a semitrailer.

Trailer 10 is a conventional forty foot semitrailer with side wall 10A extending up from the floor 10B of trailer 10. Lower retaining channel 11 is attached horizontally to the bottom of side wall 10A by angle brackets 13. Upper retaining channel 12 is similarly attached to the upper portion of side wall 10A by angle brackets 13. Removable end channels 14 attach between each end of upper retaining channel 12 and lower retaining channel 11 and prevent panels 15 from sliding out of retaining channels 11 and 12. Safety cable 16 is held taut between anchors 16B.

Retaining channels 11 and 12 have a rectangular cross section with an open end. The sides of lower retaining channel 11 extend upward forming a channel between them into which panels 15 slide. Upper retaining channel 12 is similar to lower retaining channel 11 in construction, however, the sides of upper retaining channel 12 extend downward.

Both retaining channels 11 and 12 are constructed of ⅛ inch steel. Thinner steel is easily substituted for the sides where less strength is required.

Removable end channels 14 retain panels 15 in retaining channels 11 and 12. End channels 14 are similar in construction to retaining channels 11 and 12 except that the sides of end channels 14 extend horizontally. End channels 14 make the invention more stable and reliable over other restraining means by extending along the entire edge of panels 15 and blocking or deflecting the 60+ mile per hour(MPH) winds which buffet trailers.

End channels 14 also secure the leading and trailing edges of panels 15 which would otherwise be subject to buffeting and related damage such as excessive shaking, pounding, rattling, bending, banging, scraping, and the like due to the high winds.

Panels 15 are preferably conventional roadside billboard panels made of 20 gauge galvanized steel. Each panel 15 measures 28 12/16 inches wide by 8 feet 2 inches tall, however, those of ordinary skill in the art readily see that the invention is easily scaled to accommodate other size panels.

Pull straps 17A and 17B aid in moving the assembly of panels 15 through retaining channels 11 and 12. Pull straps 17A and 17B are either straps or cables and are either pulled by hand or by mechanical pulling means 18A and 18B. Pulling means 18A and 18B include, but are not limited to, winches, comealongs, or the like.

The retaining channels 11 and 12, angle brackets 13, end channels 14, and panels 15 are described in more detail below.

Figure 2:
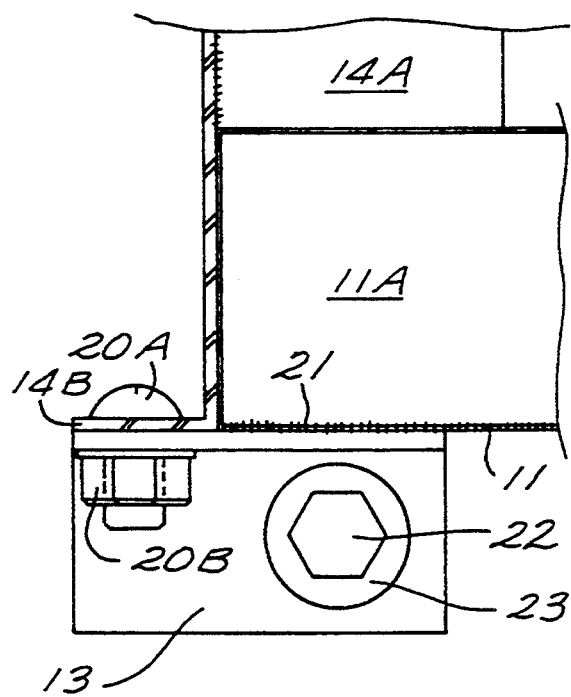
FIG. 2 shows a removable end channel attached to the upper and lower retaining channels.

FIG. 2 shows a removable end channel attached between the upper and lower retaining channels.

Removable end channel 14 is constructed similar to upper and lower retaining channels 11 and 12 using ⅛ inch steel. However, the sides 14A of end channel 14 are displaced from the end of end channel 14 to accommodate the sides 11A and 12A of retaining channels 11 and 12. End channel 14 has a flange 14B at each end with a hole to accept bolts 20A and nuts 20B which secure end channel 14 to upper and lower retaining channels 11 and 12.

Angle brackets 13 secure the lower and upper retaining channels 11 and 12 to the side wall of the trailer. One leg of each angle bracket 12 are attached to the retaining channels 11 and 12 by welds 21. The other leg of each angle bracket 13 has an aperture for receiving bolt 22 which, along with a nut (not shown), secures the retaining channels 11 and 12 to the side wall of the trailer.

Those of ordinary skill in the art readily see many similar designs which accomplish the substantially same result in substantially the same way.

Figure 3:
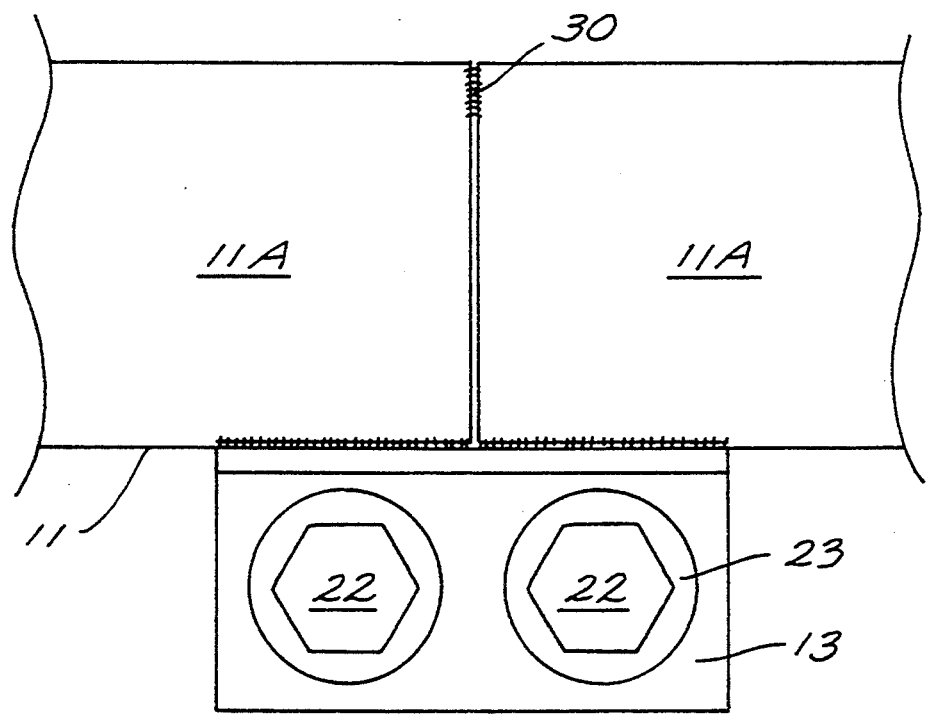
FIG. 3 shows the detail of an angle bracket that attaches the retaining channels to the side wall of the trailer.

FIG. 3 shows the front view detail of a typical angle bracket which attaches the upper and lower retaining channels to the side wall of trailer.

One leg of angle bracket 13 is welded to retaining channel 11. The other leg of angle bracket 13 has two apertures for receiving bolts 22 which secure the angle bracket 13 to the trailer. Angle brackets 13 are preferably three inches wide and are welded to the retaining channels at 24 inch intervals.

Also shown is splice weld 30 which attaches two sections of retaining channel sides 11A.

Figure 4A:
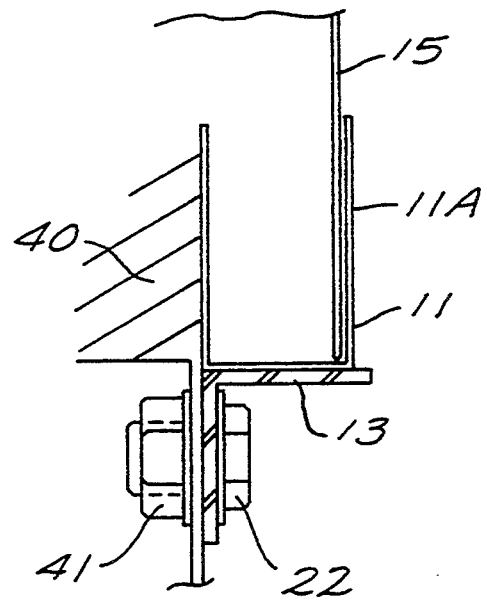
FIG. 4A is a side cutaway view along section 4—4 in FIG. 1 showing a panel positioned in the upper and lower retaining channels.

FIG. 4A is a side cutaway along section 4—4 of FIG. 1 showing a panel positioned in the upper and lower retaining channel 11 and 12.

Panel 15 is held by lower retaining channel 11 and upper retaining channel 12. Retaining channels 11 and 12 are secured to the trailer side wall 40 by angle brackets 13, bolts 22, and nuts 41. In the preferred embodiment, the trough formed in the retaining channels are 1¼ inch wide and are 2¼ inch deep.

Figure 4B:
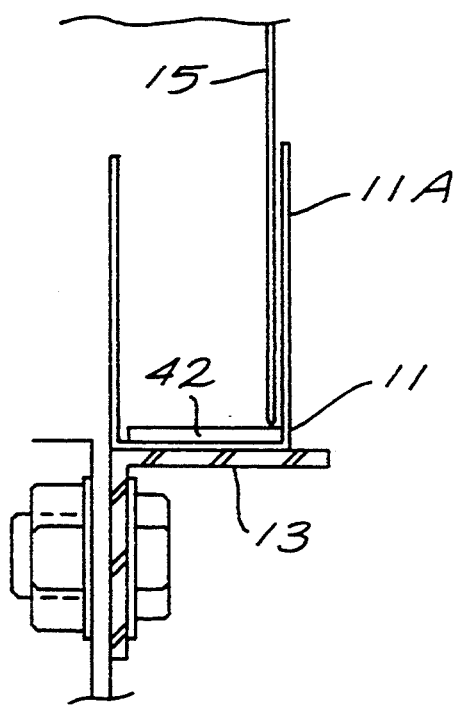
FIG. 4B is a side cutaway view of a lower retaining channel equipped with a friction reducing means.

FIG. 4B is a side cutaway view of a lower retaining channel equipped with a friction reducing means.

Panel 15 slides on friction reducing means 42. Several embodiments of friction reducing means are envisioned, including, but not limited to, plastic or teflon like materials, rollers, or merely grease lubricating the steel retaining channels.

Figure 4C:
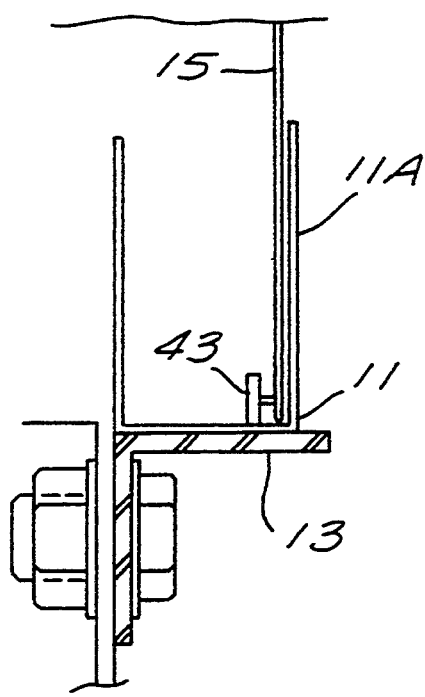
FIG. 4C is a side cutaway view of a lower retaining channel and a panel equipped with wheels.

FIG. 4C is a side cutaway view of a lower retaining channel and a panel equipped with wheels.

Wheel 43 is rotatably connected to panel 15. Wheel 43 supports panel 15 and permits panel 15 to easily slide through lower retaining channel 11.

FIG. 5A is a top view of two panels showing a tongue and groove joint 50, support structures 51, and a fastener 52 attaching both panels 15 together via apertures 53 in support structures.

Panels 15 interlock with tongue 50A and groove 50B. Since panels 15 are made of light weight 20 gage steel, the tongue 50A and groove 50B structures are easily formed by bending the 20 gage steel.

At periodic intervals along the edge of panels 15 are support structures 51. Support structures 51 are primarily for forming an attachment point for fasteners 52. Support structures 51 also reinforce panels 15 making them stronger and more rigid.

FIG. 5B is a rear view of panels 15 showing the design of the tongue and groove joint 15 and fasteners 52. Tongue and groove joint 50 extends the entire length of panels 15 but is replaced in some locations by support structures 51 which provide attachment points for fasteners 52.

In one embodiment, the safety cable 16 is threaded through the apertures 53 in support structures 51 similar to the apertures for fasteners 52 thus connecting all of the panels 15 together and providing a backup safety attachment means should any panels 15 become disengaged from the retaining channels. Safety cable 16 extends the length of the retaining channels and is secured at each end by anchor means.

FIG. 6 shows an embodiment of the invention using a vinyl sign attached to the rear rolling door 61 of trailer 10 by hook and loop fasteners.

The hook portion 60A of hook and loop fastener stripes are attached to door 61 with conventional means including, but not limited to, screws, rivets, nuts and bolts, glue, or the like.

The mating loop portion 60B of hook and loop fastener strips are attached to the back of vinyl sign 65. Vinyl sign is pressed onto the rolling door 61 so that the loop fastener strips 64 on sign 65 attach to hook fastener strips 60 on the roll door 61.

The preferred embodiment uses VELCRO ® brand of hook and loop fasteners and SUPERFLEX brand of vinyl material for sign 65.

This general description of the preferred embodiment has been for descriptive purposes only and is not intended to limit the scope of the invention. Those skilled in the art readily understand that there are many equivalent embodiments of this invention which utilize substantially the same material in substantially the same way to achieve substantially the same result and would therefore infringe on this invention.

It is clear from the foregoing that the present invention represents a new and useful system for mounting advertising materials and the like to the sides of commercial trailers and similar shaped vehicles.

What is claimed is:

1. A billboard mounting system for a commercial trailer having a side wall suitable for supporting billboard panels comprising:
   a) a lower retaining channel;
   b) an upper retaining channel;
   c) a plurality of mounting bracket means, a first allotment of said mounting bracket means affixed to said lower retaining channel for mounting said lower retaining channel horizontally to the exterior bottom portion of said side wall of said trailer, a second allotment of said mounting bracket means affixed to said upper retaining channel for mounting said upper retaining channel horizontally to the exterior upper portion of said side wall of said trailer;
   d) a plurality of panels mounted between said lower retaining channel and said upper retaining channel; and,
   e) a safety cable for retaining any of said panels that become disengaged from said upper retaining channel and said lower retaining channel.

2. The billboard mounting system for a commercial trailer according to claim 1, further comprising at least one end retainer means for arresting said panels in said lower retaining channel and said upper retaining channel.

3. The billboard mounting system for a commercial trailer according to claim 2, wherein each of said panels have:
   a) at least one tongue portion for mating with an adjacent panel,
   b) at least one groove portion for mating with an adjacent panel, and,
   c) at least one aperture to receive fasteners for securing two of said panels together.

4. The billboard mounting system for a commercial trailer according to claim 3, further comprising at least one light mounted to the exterior of said trailer and positioned to illuminate said panels.

5. The billboard mounting system for a commercial trailer according to claim 4, further comprising friction reducing means positioned in said lower retaining channel for reducing the force required to move said panels through said lower retaining channel.

6. The billboard mounting system for a commercial trailer according to claim 4, wherein said panels have wheels attached to said panels for rolling said panels through said lower retaining channel.

7. The billboard mounting system for a commercial trailer according to claim 6, wherein said end retainer means is a removable end channel secured between said upper retaining channel and said lower retaining channel for preventing said panels from sliding out of said upper retaining channel and said lower retaining channel.

8. The billboard mounting system for a commercial trailer according to claim 7, further comprising:
   a) pull strap means attached to at least one of said plurality of panels for urging said panels through said lower retaining channel; and,
   b) mechanical pulling means mounted to said trailer and connected with said pull strap means for providing pulling force to said pull strap means.

9. A panel mounting system for a trailer having a substantially rectangular cross section and having at least one side wall suitable for supporting billboard panels comprising:
   a) lower retaining channel means mounted horizontally on a bottom portion of said side wall of said trailer for supporting a bottom portion of said billboard panels;
   b) upper retaining channel means mounted horizontally on an upper portion of said side wall of said trailer for supporting an upper portion of said billboard panels;

c) end retainer means for arresting said billboard panels in said lower retaining channel means and said upper retaining channel means; and, d) safety cable means for retaining any of said panels that become disengaged from said upper retaining channel means and said lower retaining channel means.

10. The panel mounting system for a trailer according to claim 9, further comprising at least one rigid billboard panel slidably mounted between said lower retaining channel means and said upper retaining channel means such that an upper edge of each of said billboard panels contacts the upper retaining channel and a lower edge of said billboard panels contacts the lower retaining channel.

11. The panel mounting system for a trailer according to claim 10, further comprising friction reducing means positioned in said lower retaining channel means for reducing the force required to move said billboard panels through said lower retaining channel means.

12. The panel mounting system for a trailer according to claim 11, further comprising illumination means mounted to the exterior of said trailer for illuminating said billboard panels.

13. The panel mounting system for a trailer according to claim 12, wherein each of said panels have:

a) tongue and groove joint means for joining said panels together, and, b) at least one aperture means to receive fasteners for securing said panels together.

14. The panel mounting system for a trailer according to claim 13, further comprising pulling means attached to at least one of said at least one billboard panels for moving said at least one billboard panels along said lower retaining channel means and said upper retaining channel means.

15. The panel mounting system for a trailer according to claim 14, further comprising friction reducing means positioned in said lower retaining channel means for reducing the force required to move said panels through said lower retaining channel means.

* * * * *